United States Patent
Sgambati et al.

(10) Patent No.: US 7,337,953 B2
(45) Date of Patent: Mar. 4, 2008

(54) NEGOTIABLE INSTRUMENT AUTHENTICATION SYSTEMS AND METHODS

(75) Inventors: Glen Sgambati, Glendale, AZ (US); Robert Perrotta, Scottsdale, AZ (US); Rich Mayo, Cave Creek, AZ (US)

(73) Assignee: Early Warning Services, LLC., Scottsdale, AZ (US)

( * ) Notice: Subject to any disclaimer, the term of this patent is extended or adjusted under 35 U.S.C. 154(b) by 185 days.

(21) Appl. No.: 11/083,545

(22) Filed: Mar. 18, 2005

(65) Prior Publication Data

US 2005/0211763 A1 Sep. 29, 2005

Related U.S. Application Data

(63) Continuation-in-part of application No. 10/773,642, filed on Feb. 6, 2004.

(51) Int. Cl.
G06Q 40/00 (2006.01)
G07D 11/00 (2006.01)
G07F 19/00 (2006.01)

(52) U.S. Cl. ...................... 235/379; 235/382
(58) Field of Classification Search ............... 235/379; 705/16; 382/137–139
See application file for complete search history.

(56) References Cited

U.S. PATENT DOCUMENTS

| | | | |
|---|---|---|---|
| 5,175,682 A | 12/1992 | Higashiyama et al. | |
| 5,265,007 A | 11/1993 | Barnhard, Jr. et al. | |
| 5,404,488 A | 4/1995 | Kerrigan et al. | |
| 5,679,938 A | 10/1997 | Templeton et al. | |
| 5,679,940 A | 10/1997 | Templeton et al. | |
| 5,819,236 A | 10/1998 | Josephson | |
| 5,832,463 A * | 11/1998 | Funk ........................... | 705/35 |
| 5,832,464 A | 11/1998 | Houvener et al. | |
| 6,119,103 A | 9/2000 | Basch et al. | |
| 6,189,785 B1 | 2/2001 | Lowery | |
| 6,351,735 B1 | 2/2002 | Deaton et al. | |
| 7,004,382 B2 | 2/2006 | Sandru | |
| 7,177,846 B2 | 2/2007 | Moenickheim et al. | |
| 2002/0052852 A1 | 5/2002 | Bozeman | |

(Continued)

OTHER PUBLICATIONS

"BB&T, Star Systems and International Check Services Successfully Complete First Safecheck Transactions," News Release dated Aug. 24, 2000, printout from website: http://www.intlcheck.com/pages/pressre/20000824.html, 2 pages, printout date: Mar. 4, 2002.

(Continued)

*Primary Examiner*—Lisa Caputo
(74) *Attorney, Agent, or Firm*—Townsend and Townsend and Crew LLP

(57) ABSTRACT

Systems, methods, and databases for authenticating negotiable instruments comprise receiving, at an authentication system, a plurality of data values associated with a negotiable instrument, the plurality of data values including an image security feature and an account. The method further comprises obtaining account decoding information from an account verification databases, the account verification database including decoding information for each of a plurality of financial institutions; decoding the image security feature using the account decoding information; obtaining one or more verification values from the decoded image security feature; comparing each of the verification values to a corresponding one of the data values; and transmitting a result communication indicating a result of the comparison.

25 Claims, 7 Drawing Sheets

U.S. PATENT DOCUMENTS

| | | | |
|---|---|---|---|
| 2002/0103756 A1 | 8/2002 | Andrews et al. | |
| 2003/0115470 A1* | 6/2003 | Cousins et al. | 713/179 |
| 2003/0130919 A1 | 7/2003 | Templeton et al. | |
| 2003/0217003 A1 | 11/2003 | Weinflash et al. | |

OTHER PUBLICATIONS

"Star Chek Goes Live with Online Check Verification," News Release dated Jan. 16, 2001, Star Systems, Inc., printout from website: http://www.star-systems.com/cfm/news-press.cfm?id=42, 2 pages, printout date: Feb. 20, 2002.

PPS—Deposit Chek® "Deposit Chek," printout from website: http://.64.78.123/dchek.htm, 2 pages, printout date: Mar. 20, 2002.

PPS Deposit Chek® "Preventing Check Losses at Credit Unions," 2 pages, Sep. 20, 2001.

"Financial Institution Letters, Special Alert," dated Mar. 22, 2000, printout from FDIC website: http://www.fdic.gov/news/financial/2000/fil0019/html, 1 page, printout date: Mar. 8, 2002.

"Thomson Bank InfoLink™," Thomson Financial Publishing, 2 pages, date unknown.

"eFunds Counts on SAS to Lower Risks for Banks and Retailers," printout from SAS website: http://www.sas.com/news/success/efunds.html, 2 pages, printout date: Mar. 8, 2002.

"About ChexSystems," printout from ChexSystems website: http://www.chexhelp.com/English/public/about.htm, 1 page, printout date: Mar. 8, 2002.

"ChexSystems And Deluxe Corp.," printout from CardReport website: http://www.cardreport.com/overview/bureaus/chexsystems,htm, 3 pages, printout date: Mar. 8, 2002.

"Electronic Clearing House to Power Point-of-Sale Check Service Program," ECHO Press Release dated Jul. 16, 2001, printout from website: http://www.echo-inc.com/press_115.html, 3 pages, printout date: Mar. 12, 2002.

"TeleCheck® Verification Services," printout from TeleCheck website: http://www.telecheck.com/products/verification.html, 1 page, printout date: Mar. 8, 2002.

"SCAN$^{SM}$ and SCAN OnLine$^{SM}$," printout from eFUNDS website: http://www.efunds.com/us/en/solutions/comp_a2z/pm/001118.cnt, 1 page, printout date: Mar. 4, 2002.

SCAN Consumer Help, "Welcome to the SCAN$^{SM}$ Consumer Assistance Center," Deposit Payment Protection Services, Inc., copyright date: 1999, printout from website: http://www.scanassist.com/scanassist. html, 1 page, printout date: Mar. 8, 2002.

CheckAGAIN Production Information, "Centralized Returns," printout from CheckAGAIN, LLC website: http://www.checkagain.com/returns.asp, 1 page, printout date: Mar. 8, 2002.

CheckAGAIN Product Information, "Check Authorizations," printout from CheckAGAIN, LLC website: http://www.checkagain.com/authorizations.asp, 1 page, printout date: Mar. 8, 2002.

"CheckAGAIN Adds Leading National Authorization Database to Services," News Release dated Jan. 30, 2001, printout from CheckAGAIN, LLC website: http://www.checkagain.com/press010301.asp, 2 pages, printout date: Mar. 8, 2002.

"CheckAGAIN Adds ECHO's NCIS Database to Service," News Release from ECHO, 1 page, Mar. 27, 2001.

"Operation Gold Rush Leads To Arrest of Eight Defendants Charged in Massive Credit Card Scam that Cost Banks up to $15 Million," News Release No. 99-038 from Department of Justice, 2 pages, Feb. 23, 1999.

"Compliance with Regulation CC," printout from The Federal Reserve Board website: http://www.federalreserve.gov/pubs/regcc/htm, last update of website page: Jul. 25, 2001, 6 pages, printout date: Apr. 18, 2002.

"Welcome to PayByCheck! The leading provider of electronic check processing," printout from PayByCheck website: http://www.paybycheck.com, 2 pages, printout date: Sep. 18, 2003.

"Customized Internet Solutions for Small Business People," printout from website: http://www.tconsult.com/address_verification.aspx, 3 pages, printout date: Sep. 18, 2003.

"About SCAN$^{SM}$," printout from website: http://www.scanassist.com/about.html, 1 page, printout date: Mar. 8, 2002.

"Secure Seal™—A Product Guide," EnSeal Systems Ltd., 3 pages, 2003.

* cited by examiner

Inquiry                          Response

Bank of A

Account: 456
Name: B. Doe                     YES
Address: 20 East                 YES
SS#: 987654321                   NO
Phone #: 111-222-3333            INFO NOT AVAILABLE

FIGURE 3

NEGOTIABLE INSTRUMENT AUTHENTICATION SYSTEMS AND METHODS

CROSS-REFERENCE TO RELATED APPLICATIONS

This application is a continuation-in-part of application Ser. No. 10/773,642, entitled "Account-Owner Verification Database", filed Feb. 6, 2004, the details of which are hereby incorporated by reference.

BACKGROUND OF THE INVENTION

The Check Clearing for the 21st Century Act ("Check 21") went into effect on Oct. 28, 2004. Check 21 authorized the use of the Image Replacement Document (IRD), also known as the "substitute check", in the check clearing process. The IRD is a document produced from the image of actual checks. During the imaging process, some types of security features used by financial institutions to protect against fraud are destroyed. For example, features such as micro-printing, heat seals, and colored ink may not survive the imaging process.

There are a number of vendors providing image security features that survive conversion to an image. These technologies include two-dimensional bar codes, and Secure Seal™. However, there are no interoperability standards among vendors. Thus, financial institutions that implement a solution from a first vendor cannot process and verify checks issued from other vendors.

Unfortunately, there are too many vendors of image security features to resolve the issue through bi-lateral agreement. Due to costs and implementation complexity, financial institutions or merchants are also unlikely to be able to support the numerous solutions offered by vendors of image security feature technologies. As a result, verification of a security feature will most likely not occur at the point of presentment (e.g., merchant) or bank of first deposit. Therefore, image security features are only likely to truly protect the issuer of the check and the paying financial institution. This greatly increases the loss exposure to merchants, financial institutions of first presentment, and other parties involved in the check clearing cycle.

BRIEF SUMMARY OF THE INVENTION

Systems, methods, and databases are disclosed for authenticating negotiable instruments. In one embodiment, a method for authenticating a negotiable instrument comprises receiving a plurality of data values at an authentication system. The plurality of data values are associated with a negotiable instrument and include an image security feature and an account. By way of example, receiving the plurality of data values may comprise receiving an image of the negotiable instrument and extracting the data values from the image. The method of authenticating the negotiable instrument further comprises obtaining account decoding information from an account verification database, which includes decoding information for each of a plurality of financial institutions. The image security feature is decoded at the authentication system using the account decoding information. One or more verification values are obtained from the decoded image security feature and the verification values are compared to a corresponding one of the data values. The authentication system then transmits a result communication indicating a result of the comparison.

A variety of processes may be used to decode the image security feature. In one aspect, decoding the image security feature comprises determining a decoding algorithm to apply to the image security feature. The decoding algorithm may be determined by obtaining an identifier of the decoding algorithm from the account decoding information, obtaining the decoding algorithm from the account decoding information, or other suitable mechanism. In some cases, determining the decoding algorithm may comprise determining a type associated with the image security feature (e.g., Secure Seal™, two-dimensional bar code).

The obtaining the account decoding information may comprise obtaining one or more keys used to decode the image security feature. Alternatively or additionally, obtaining the account decoding information may comprise obtaining one or more decoding templates to use to decode the image security feature, and/or obtaining a decoding algorithm. In still other instances, obtaining the account decoding information may comprise obtaining financial institution decoding information for a financial institution associated with the account.

In some aspects, the method may further comprise obtaining a data element from an account verification database, the data element associated with the account and corresponding to one of the data values and determining if the data element matches the corresponding data value. A positive response is transmitted if the data element matches the corresponding data value and a negative response is transmitted if the data element does not match the corresponding data value.

In a second embodiment, a method is disclosed which comprises obtaining first decoding information from a first financial institution. The first decoding information includes information to decode a first type of negotiable instrument image security feature (e.g., decoding algorithm, keys used to decode first type of image security feature). The method also comprises obtaining second decoding information from a second financial institution. The second decoding information includes information to decode a second type of negotiable instrument image security feature. The method may also comprise populating an account verification database with at least a portion of the first decoding information and the second decoding information.

In some aspects, the method may further comprise collecting participant data elements from one or more participant institutions. The participant data elements are associated with one or more participant accounts in the participant institution. Non-participant data elements are also collected from one or more non-participant institutions. Data element fields of an account verification database are populated with the collected participant and non-participant data elements.

In a third embodiment, an account verification database is disclosed which comprises first decoding information for a first financial institution and second decoding information for a second financial institution. The first decoding information (e.g., decoding algorithm, key, decoding template) is used to decode a first type of negotiable instrument image security feature. The second decoding information is used to decode a second type of negotiable instrument image security feature.

In a fourth embodiment, a system is disclosed which comprises a communications interface, an account verification database, and logic. The communications interface is configured to receive a plurality of data values associated with a negotiable instrument. The plurality of data values include an image security feature and an account. The communications interface is further configured to transmit a result communication indicating an authentication result.

The account verification database stores decoding information for each of a plurality of financial institutions. Logic, is communicatively coupled with the communications interface and the account verification database. The logic is configured to obtain account decoding information corresponding to the account from the account verification database, to decode the image security feature using the account decoding information, to extract one or more verification values from the decoded image security feature, and to determine the authentication result based at least in part on a comparison of each of the verification values to a corresponding one of the data values.

In further embodiments, the system may also comprise first and second decoding algorithms. The first decoding algorithm decodes a first type of image security feature and the second decoding algorithm decodes a second type of image security feature. The logic is configured to decode the image security feature at least in part by executing one of the first decoding algorithm and the second decoding algorithm.

In a fifth embodiment, a method is disclosed which comprises receiving a request to authenticate a negotiable instrument. The request includes an image security feature and one or more data values associated with the negotiable instrument. A decoding entity associated with the negotiable instrument is determined and the image security feature is transmitted to the decoding entity. Authentication information associated with the image security feature is then received from the decoding entity. A result communication is transmitted indicating an authentication result which is based at least in part on the authentication information.

In some aspects, the authentication information may comprise verification value(s) extracted from the image security feature and the method may further comprise comparing the verification values to a corresponding one of the data values. The authentication result is determined based at least in part on the comparison. In other aspects, the data values may be transmitted to the decoding entity and the authentication information received from the decoding entity may comprise the authentication result.

BRIEF DESCRIPTION OF THE DRAWINGS

Illustrative embodiments in accordance with the invention are illustrated in the drawings in which:

FIG. 3 is a table showing an example of an inquiry to the account verification database of FIG. 2;

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
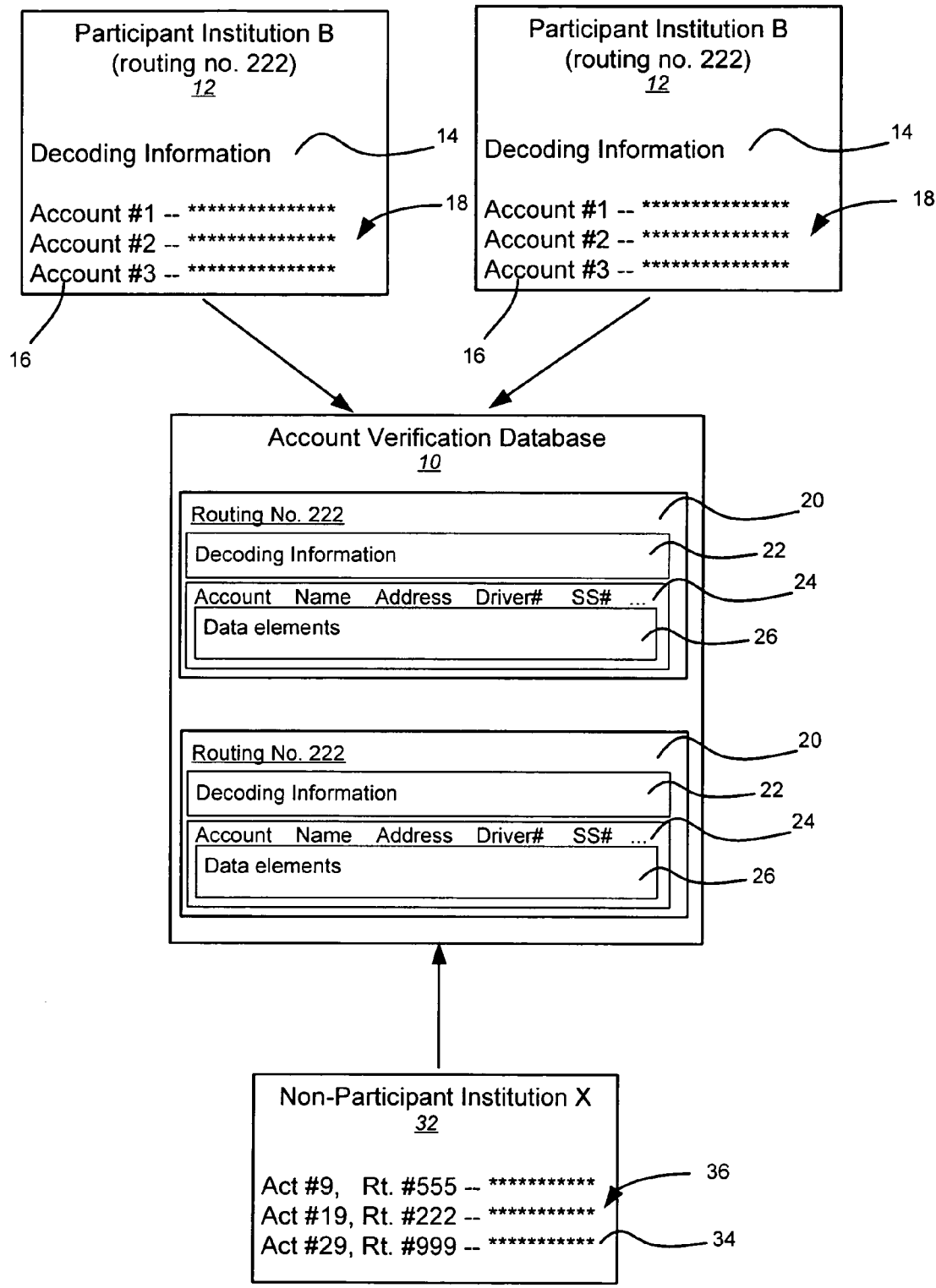
FIG. 1 is a block diagram illustrating an exemplary embodiment of an account verification database.
Figure 2:
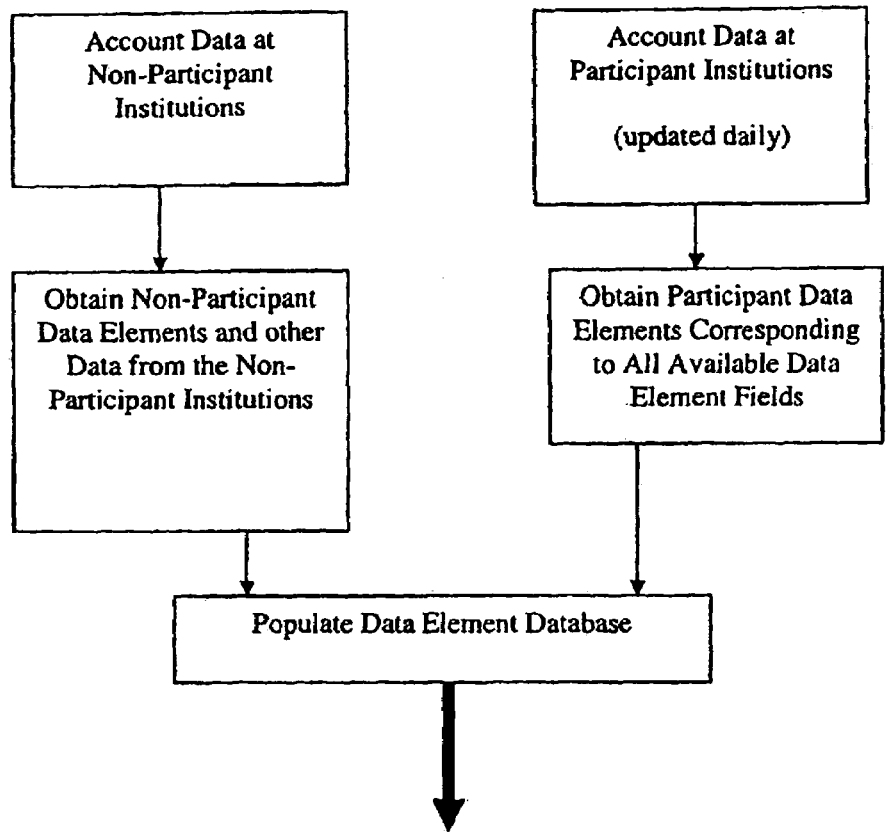
FIG. 2 is a flow diagram illustrating an example of an account verification database.

Referring to FIGS. 1-3, an account verification database, generally designated 10 is shown. Account verification database 10 may provide verification of specific accountholder information upon inquiry and may be contributed to and updated on a regular basis. Account verification database 10 may alternatively or additionally include information used to decode negotiable image security features. It should be appreciated that account verification database 10 may be one or more relational databases, object databases, text files, spreadsheet files, internal software lists, and/or other suitable type of data structure. Thus, the information illustrated in FIG. 1 may be included in one database structure or multiple database structures. It should also be appreciated that alternative embodiments may not include all of the information illustrated in FIG. 1.

Account verification database 10 may be populated by collecting decoding information 14 from a plurality of participant institutions 12. Participant institutions 12 may provide decoding information 14 used to decode negotiable instrument security features used by the participant institutions 12. Decoding information 14 may include one or more of an identifier identifying a decoding algorithm to use, a decoding algorithm, one or more keys used to decode an image security feature, decoding templates, and/or a type of image security feature used by the financial institution. The participant institutions 12 may be banks or other financial institutions, other agencies, entities or institutions which may provide decoding information to the account verification database 10.

Account verification database 10 may alternatively or additionally be populated by collecting other participant data elements related to participant accounts 16. In some embodiments, participant institutions 12 may have agreed to continually and automatically provide current, accurate information related to participant accounts 16, in a predetermined quantity and format, to the account verification database 10 with which to populate the database 10. The participant institutions 12 need not specifically be financial institutions, but may be other agencies, entities or institutions which have the ability to provide accurate financial account data on a regular basis.

The participant data elements 18 provided by the participant institutions 12 may include information which corresponds to the individual participant accounts 16 held and/or maintained by that participant institution 12. A data element 18 may thus be a piece of information associated with a participant account 16 and which helps identify the owner of that account and/or another data element of that participant account 16. Generally, a participant data element 18 for an account may be any categorized information associated with a particular account. For example, possible categories of data elements include names, addresses, dates of birth, identification/drivers' license numbers, social security numbers, tax i.d. numbers, account type, channel origination and other type of data typically associated with checking (or other) accounts.

Account verification database 10 may be populated in part by extracting and collecting data elements 18 associated with one or more participant accounts 16 from one or more participant institutions 12. The data elements 18 from a single participant institution 12 may be related to one or more participant accounts 16. That is, a participant institution 12 may populate account verification database 10 with data elements 18 from a single account or with data elements 18 from multiple accounts.

Account verification database 10 may also collect and store non-participant data elements 36 corresponding to non-participant accounts 34 held by non-participant institutions 32. A non-participant institution 32 is an entity capable of supplying financial account information, but which is not capable of nor obligated to provide account information to account verification database 10 on a regular and/or automatic basis. Additionally, the information provided by a non-participant institution 32 need not be accurate. For example, non-participant institutions may have access to account information which is obtained from negative (as opposed to positive) populated databases, thereby containing information which, for example, may be triggered only by "bad events" or which is otherwise less than current. Therefore, non-participant data elements 36 may be collected from a variety of sources and are not necessarily accurate or current.

One example of a non-participant institution 32 is a check imaging service or database, such as ViewPointe. Imaging checks and reading account information therefrom is well known in the art. Therefore, a description of check imaging systems is omitted here for convenience only, and should not be considered limiting. Using such a system, non-participant data elements 36 may be obtained by extracting account information from the collected check images. Other non-participant institutions 32, and therefore sources of non-participant data elements 36, include, for example, check printers, electronic bill payment companies, WEB and TEL transacted bill payment systems, Internet account openings and Internet banking (e.g., ING, Net Bank) and other similar services. Each of these services contains at least non-participant data elements 36 which, if collected and stored in account verification database 10, adds to the robustness of account verification database 10. For example, non-participant data elements 36 may be obtained in the form of check printer data. Although not an account holding institution such as a traditional bank, a check printer nonetheless has access to accurate financial account information, albeit on a limited scale in comparison to account information available to an actual participant institution 12.

Additionally, in place of or in addition to non-participant data elements 36 comprising raw account information gathered from non-participant institutions 32, account verification database 10 may also be populated with non-participant data elements 36 which are based on statistically accurate or analyzed account information from non-participant institutions 32, thereby adding an additional level of accuracy to the non-participant data elements stored in the database 10. The participant data elements 18 need not be exclusively obtained through the automatic population scheme discussed above, but may also be obtained from the sources noted herein for obtaining non-participant data elements 36. Furthermore, a non-participant institution 32 may transition to become a participant institution 12, assuming that all of the necessary accuracy and updating requirements are satisfied.

Account verification database 10 may include one or more decoding information fields 22 populated by decoding information 14. By way of example, decoding information fields 20 may include decoding algorithm identifiers, decoding algorithms, keys used to decode image security features, decoding templates, type of image security feature, or other type of decoding information used to decode image security features. At least a portion of decoding information data fields may be associated with a particular institution 20. Alternatively or additionally, some decoding information fields 22 included in account verification database 10 may be associated with a particular accounts 24 maintained at an institution 20 or an image security feature type.

Account verification database 10 may alternatively or additionally include a plurality of data element fields 26 related to account owner information. In one embodiment, the available data element fields include: routing transit number, account number, names, addresses, dates of birth, identification/drives license numbers, social security numbers, tax i.d. numbers, account type, channel origination and other various data that may be associated with checking (or other) accounts. Each of the data element fields 26 may contain a corresponding participant or non-participant data element 18, 36 obtained from a participant or non-participant institution 12, 32, respectively, as discussed above. Thus, for example, a data element (e.g. account information) which is denoted as "driver's license number" obtained from a participant or non-participant institution 12, 32 may be stored in the database 10 in the data element field 26 labeled "driver's license number".

In some embodiments, for each new or updated account from a participant institution 12, the participant institution 12 may be required to provide sufficient participant data elements 18 to fill a minimum set of data element fields 26. In one embodiment, the minimum required data element fields 26 include: routing transmit number, account number, one name, one address, and one social security or tax i.d. number. Other participant data elements 18 may also be sent by the participant institution 12. The minimum set of data element fields supplied by a participant institution 12 need not be the specific fields noted above, but rather may be adjusted according to the particular account verification application.

It should be appreciated that since non-participant institutions 32 may not have a wide array of account information, not all of the available data element fields 26 in account verification database 10 which are populated with participant data elements 18 may be collectable for accounts related to non-participant institutions 32. For example, paper checks include limited personal information printed thereon. Thus, non-participant data elements 36 provided through non-participant institutions 32 such as check imaging systems (e.g., ViewPointe) and/or check printers may not have sufficient account information to populate all of the available data element fields 26 in account-verification database 10. Accordingly, the database 10 may not include a full complement of non-participant data elements 36 for a given account 24. Additionally, since the non-participant data elements 36 are often not as reliable nor complete as participant data elements 18, an account 24 which includes data element fields 26 which are populated with non-participant data elements 36 may be noted in account verification database 10 as containing data elements from non-participant institutions 32.

In some embodiments, account verification database 10 may be used to determine if a person is authorized to transact on a particular account (i.e., the account number presented to the merchant). Thus, account verification database 10 may be structured such that the data element fields 26 related to account ownership are arranged in the database 10 according to corresponding account number 24. Since multiple participant and non-participant institutions 12, 32 may have the same account number 24, the individual account numbers 24 may be arranged within account verification database 10 according to institution 20 (e.g., routing transit number). In alternative embodiments, account verification database 10 may also be structured or organized according to other schemes.

In some aspects, account owner data elements 26 in account verification database 10 may be initially populated by the participant institutions 12 with a single file including participant data elements 18 for accounts maintained by the participant institution 12. Once the account owner data elements 26 have been initially populated, the account owner data elements 26 in account verification database 10 may be updated with new information associated with the account(s) at the participant institution 12 based on newly opened and/or recently maintained accounts. For instance, account verification database 10 may be refreshed or updated with participant data elements 18 associated with accounts at participant institutions 12 which have been recently opened, closed, changed in status (e.g., overdrawn) or which have incurred changes to one or more of the data elements associated with the account. In some aspects, the collected data elements in account verification database 10 may be stored and updated at regular intervals. Such automatic and continuous updating of account verification database 10 may provide an inquirer with a robust account verification tool. Account verification database may also be updated in less frequent intervals with new and/or updated non-participant data elements 36 obtained from the non-participant institutions 32.

The population and inquiry of account owner data elements 26 in account verification database 10 will be explained through the following example, in conjunction with FIGS. 2 and 3. As shown in FIG. 2, the sample populated account owner data elements 26 contain five different account entries. Non-participant data elements 36 for account numbers 789 and 432 were obtained from a non-participant institution 32, as denoted in the last data element field 26.

To submit an inquiry to the account verification database 10, an inquirer may provide an account number 24 and at least one other data element (purportedly corresponding to that account number) for verification. In cases where account verification database 10 is also organized according to institution, the inquirer may also provide an institution identifier, such as routing transit number 20, which corresponds to the designated account 24. The inquirer may enter an account number and multiple data elements to be verified at once. Assuming that the requested account number is in account verification database 10, the entered data elements may be queried against the information stored in the corresponding account owner data element field(s) 26 associated with the entered account number 24. In one embodiment, account verification database 10 may return a verification of each individual submitted data element corresponding to that account number. By way of example, for each data element in an inquiry, a response of "yes", "no" or "information not available" may be returned to the inquirer. A positive response (e.g., "yes") may be received if the entered data element matches the content of the corresponding data element field 26 in account verification database 10 for the entered account number. Similarly, a negative (e.g., "no" response) may be returned to the inquirer if the entered data element does not match the content of the corresponding data element field 26 in account verification database 10 for the entered account number. An unavailable information response may be received if the data element field 26 in account verification database 10 corresponding to the entered data element is empty. The complete response received by the inquirer may contain one or more of each of the possible responses. That is, account verification database 10 may respond according to each individual entered data element. Thus, in some instances, to obtain a "positive response", all of the entered data elements may not match the contents of their corresponding data element fields for the entered account number.

According to some embodiments, customer-specific data may not be provided back to the inquirer. Rather, the database may only confirm or deny the accuracy of the information as entered into the data element field which corresponds to the entered account number. An example (based on the example data elements 26 illustrated in FIG. 2) of an inquiry and response corresponding to that inquiry is illustrated in FIG. 3.

If an inquiry regarding a particular account results in a negative response on at least one data element in an inquiry, account verification database 10 may report to the participant institution 12 for that account that there was an inquiry against one of their accounts which resulted in a negative response, along with the data element(s) that produced the negative response. In the example of FIG. 3, a report to Bank of A may be generated that an inquiry was made against account #456 which produced a negative response for identified SS#.

Account verification database 10 may provide inquiry capabilities allowing inquirers to validate information about an account holder, in addition to the account's current status. Inquires submitted to account verification database 10 may be made on-line, in real time or in a batch-process. Thus, the inquirer may be a financial institution, a small business, or other entity. It should be appreciated that the account verification database 10 may be used for "faceless" transactions, such as Internet transactions, where the identity of the account holder cannot be verified. Additionally, an inquirer may determine the status and relevant account holder information about an account in real time, such that business transactions are not delayed, while still preventing fraud on the transaction.

Figure 4:
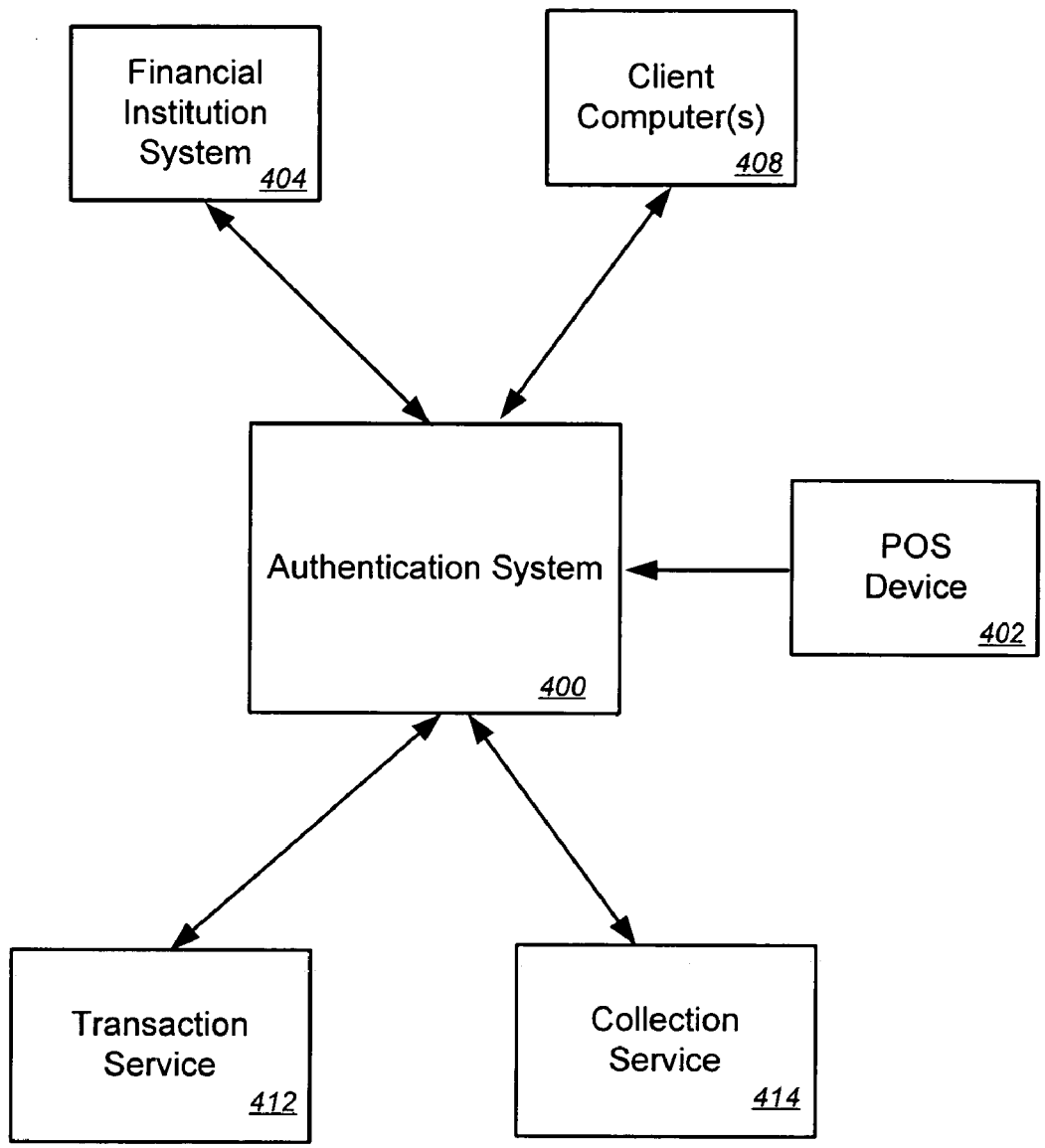
FIG. 4 illustrates an exemplary system that includes an authentication system.

FIG. 4 illustrates an exemplary system that includes an authentication system 400 that may be used to authenticate image security features contained on negotiable instruments, such as checks. In some embodiments, authentication system 400 may also be used to verify account ownership information as previously described. Authentication system may be communicatively coupled with point-of-sale device(s) 402, financial institution(s) 404, transaction service(s) 412, collection service(s) 414, and/or other client computer(s) 408.

Point-of-sale device(s) 402 may be used to perform merchant and/or customer functions related to transactions initiated by customers, such as a transaction for the purchase of goods or services or a money transfer transaction. For example, point-of-sale device(s) 402 may be used to receive payments (e.g., negotiable instrument, credit card, debit card, stored value card, or other payment type) for transactions. In some instances, the customer may elect to pay for a transaction with a negotiable instrument, such as a check. The negotiable instrument presented by the customer may include an image security feature having encoded therein information pertaining to the negotiable instrument. By way of example, information encoded within an image security feature may include payee name, dollar amount, check number, date, and/or account details.

Point-of-sale device(s) 402 may transmit the image security feature and other data values included on the face of a negotiable instrument to authentication system 400. In some aspects, the image security feature and data values associated with the negotiable instrument may be transmitted to authentication system 400 by transmitting an image of the negotiable instrument. Authentication system 400 may then determine whether the data values match the verification values encoded in the image security feature. In some embodiments, authentication system 400 may decode the image security feature to extract the verification values by using an account verification database, such as that previously described. Alternatively, authentication system 400 may route the encoded image security feature to a financial institution 404 associated with the negotiable instrument (e.g., paying financial institution) to decode the image security feature. In some aspects, authentication system 400 may then receive the verification values from financial institution 404 and compare the values to the data values included on the face of the negotiable instrument. In other aspects, the financial institution 404 may perform the comparison of verification values to the data values. Authentication system 400 may in some embodiments also do further processing to verify account ownership details as previously described.

Other parties 404, 408, 412, 414 that may be involved in the clearing process of the negotiable instrument may additionally, or alternatively, be communicatively coupled with authentication system 400. Financial institution system(s) 404 may be a financial institution of first presentment, a paying financial institution, or other intermediary financial institution 404. Transaction service(s) 412 may perform authorization or other types of transaction services for point-of-sale devices or other types of clients. Collection service(s) 414 may perform collections of negotiable instruments. Other client(s) 408 may also communicate with authentication system 400 to authenticate negotiable instruments. As with point-of-sale device(s) 402, financial institution system(s) 404, transaction service(s) 412, collection service(s) 414 and/or other client(s) 408 may transmit an image security feature and other data values included on a negotiable instrument (e.g., account number, payee, dollar amount) to authentication system to verify that verification values encoded within the image security feature match data values read from the negotiable instrument.

Figure 5:
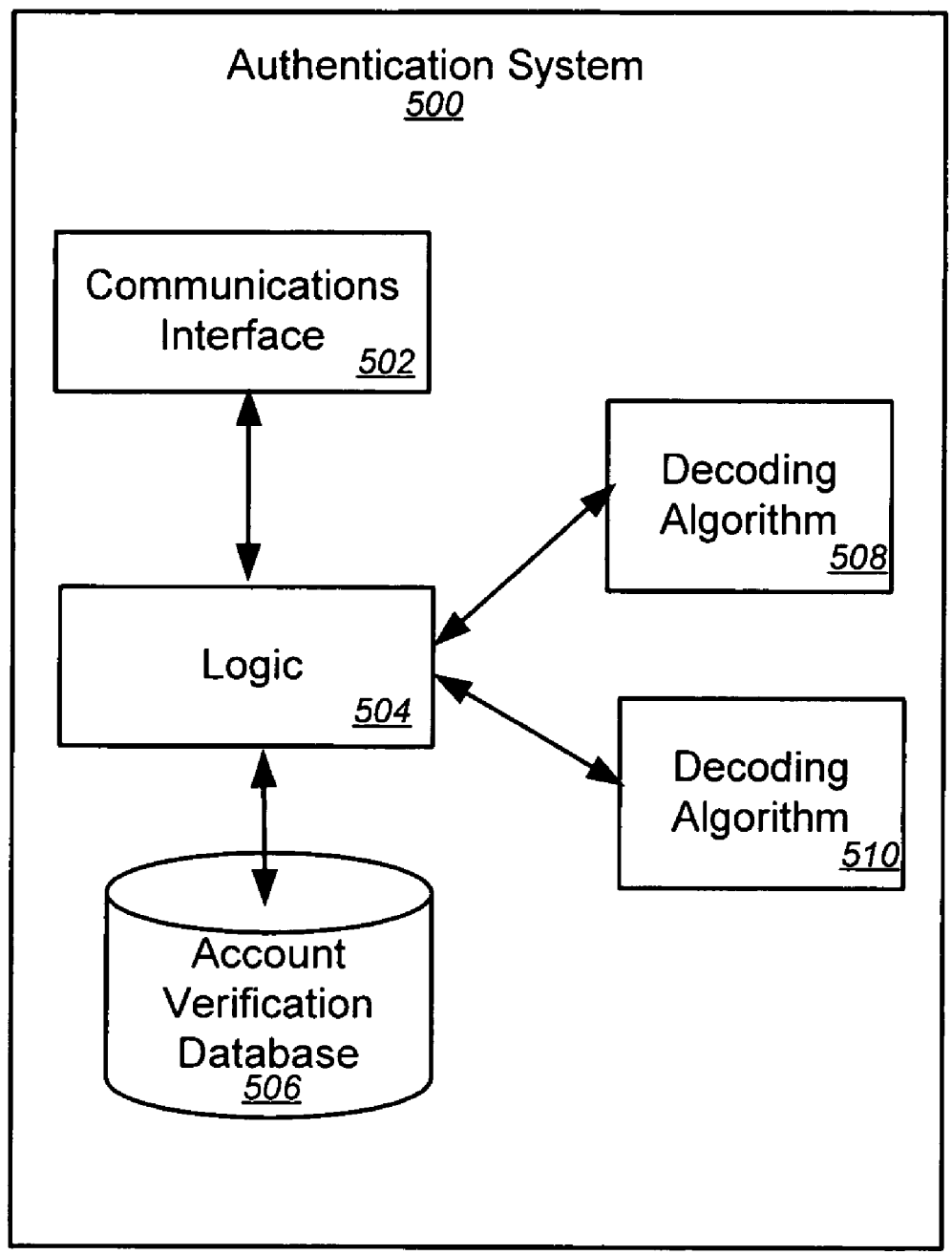
FIG. 5 illustrates an exemplary embodiment of an authentication system.

FIG. 5 illustrates an exemplary embodiment of an authentication system 500 that may be used to authenticate image security features included on negotiable instruments. Authentication system 500 may include logic 504 communicatively coupled with communications interface 502, account verification database 506, and one or more decoding algorithm(s) 508, 510. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that the components 502, 504, 506, 508, 510 of authentication system 500 may reside on the same or different physical devices.

Communications interfaces 502 may be used to receive communications from requesters requesting authentication of an image security feature included on a negotiable instrument. In some instances, received communications may be batch communications requesting authentication of a plurality of negotiable instruments. Communications interfaces 502 may also be used to transmit authentication results to requesters. In some embodiments, communications interface 502 may include an interface to a wide area network (WAN), such as the Internet, or proprietary networks. Alternative or additional types of interfaces may also be included as components of communications interface 502.

Logic 504 may be used to process requests to authenticate negotiable instruments. Logic 504 may interact with account verification database 506 and one or more decoding algorithms 508, 510 to perform authentication of image security features included on negotiable instruments. In some embodiments, logic 504 may also interact with account verification database 506 to perform account ownership verification of the data values, such as verifying that an account name obtained from the negotiable instrument is associated with the account number in account verification database 506. It should be appreciated that logic 504 and decoding algorithms 508, 510 may be one or more software programs, one or more components of a software program (e.g., function or program object), firmware, or other type of machine-executable instructions.

Account verification database 506 may include decoding information used to decode image security features. Decoding information may include an identifier of a decoding algorithm, keys used by a decoding algorithm, decoding templates, or other information needed to decode an image security feature. Decoding information included in account verification database 506 may be associated with financial institutions and/or financial account numbers. Thus, it should be appreciated that decoding information for different financial institutions/accounts may be used to decode different types of image security features. For example, decoding information may be used by logic 504 to determine which decoding algorithm 508, 510 to execute to decode the image security feature and/or may be passed to a decoding algorithm 508, 510 as inputs to decoding algorithms 508, 510. Either logic 504 or decoding algorithms 508, 510 may then determine if data values obtained from the face of the negotiable instrument match verification values included in the image security feature. As previously described, account verification database 506 may also include data elements that may be used to verify account ownership.

In alternative embodiments, authentication system 500 may comprise additional, fewer, or alternative components than the components 502-510 illustrated in FIG. 5. For instances, in some embodiments, authentication system may not include account verification database 506 and/or decoding algorithms 508, 510. Instead, authentication system 500 may include logic to route an image security feature to a financial institution for decoding of the image security feature. Other variations are also contemplated.

Figure 6:
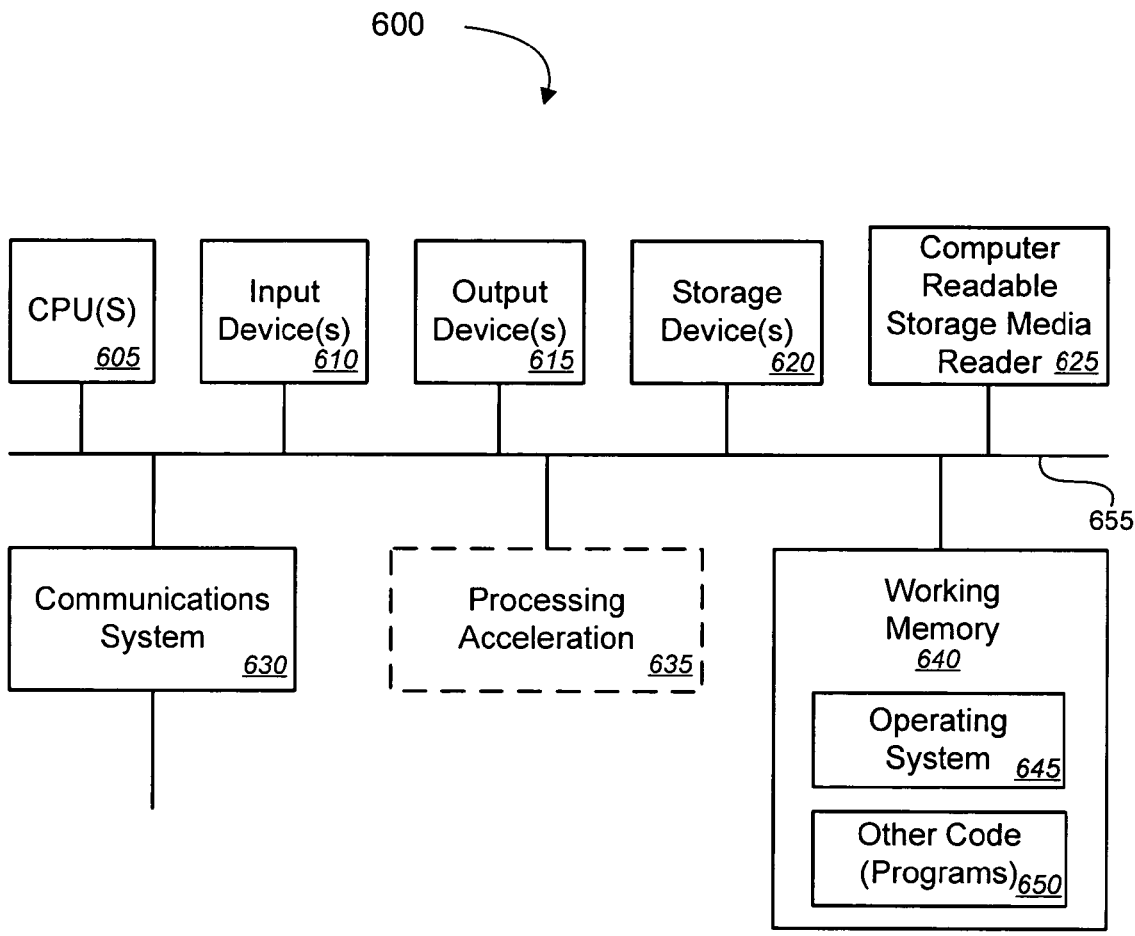
FIG. 6 is a block diagram of an exemplary computer system upon which an authentication system may be implemented.

FIG. 6 illustrates one embodiment of a computer system 600 upon which an authentication system or components of an authentication system may be implemented. The computer system 600 is shown comprising hardware elements that may be electrically coupled via a bus 655. The hardware elements may include one or more central processing units (CPUs) 605; one or more input devices 610 (e.g., a scan device, a mouse, a keyboard, etc.); and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with a network and/or any other computer or other type of device, such as a POS device.

The computer system 600 may also comprise software elements, shown as being currently located within a working memory 640, including an operating system 645 and/or other code 650, such as an application program. The application programs may implement a framework, components of a framework, and/or the methods of the invention. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Figure 7:
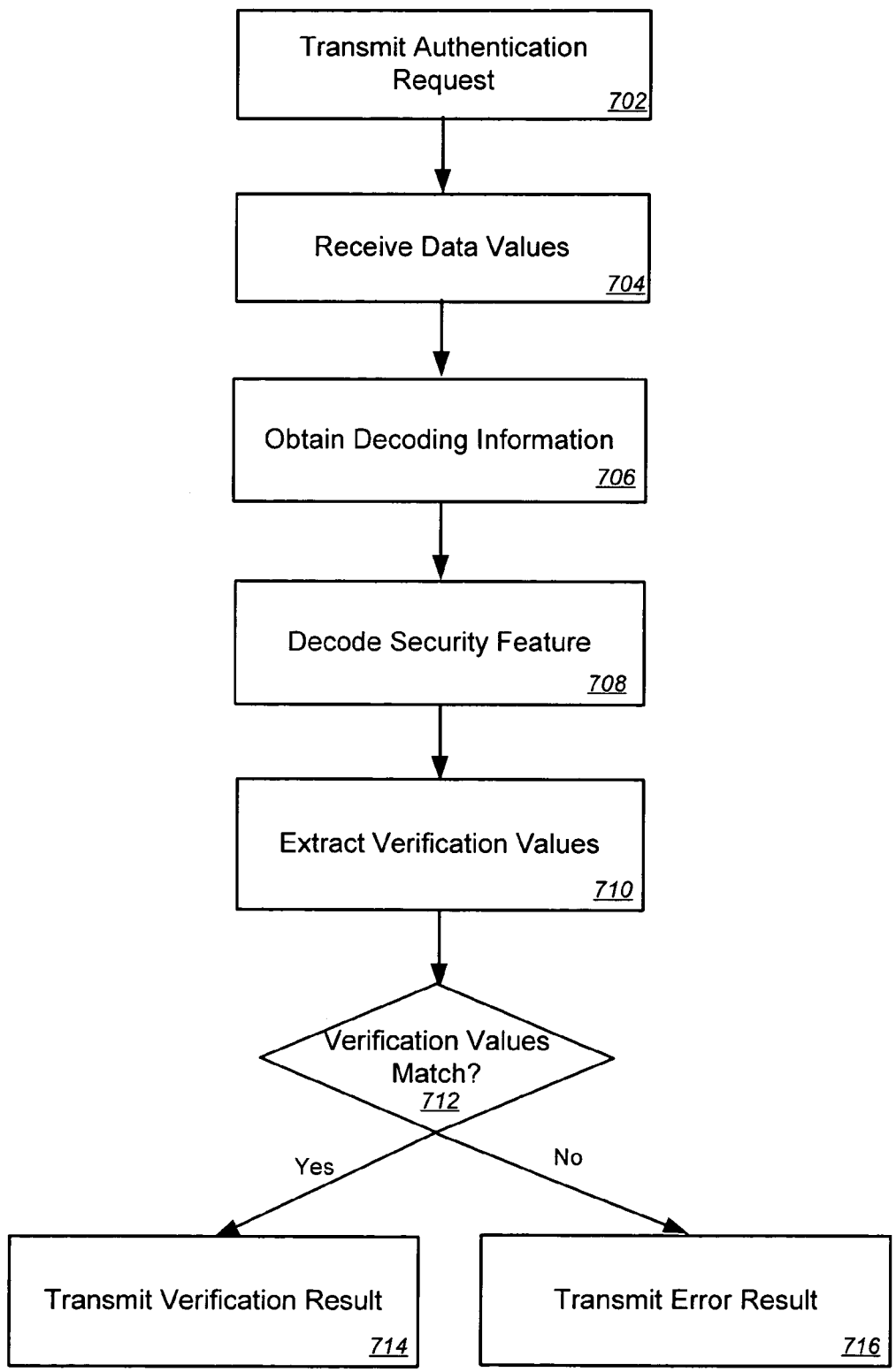
FIG. 7 is a flow diagram illustrating an exemplary method that may be used to authenticate a negotiable instrument image security feature.

FIG. 7 is a flow diagram illustrating an exemplary method that may be used to authenticate a negotiable instrument. A point-of-sale device, financial institution system, transaction service, collection service, or other client computer may transmit 702 a request to authenticate a negotiable instrument to an authentication system. The request may include an image security feature and a plurality of data values (e.g., account number, financial institution identifier, account name, payee name, dollar amount) obtained from the negotiable instrument. In some instances, the data values and image security feature may be transmitted 702 to authentication system by transmitting an image of the negotiable instrument.

The request is received 704 at the authentication system. If the received request includes an image of the negotiable instrument, the authentication system may extract an image security feature and a plurality of data values included on the negotiable instrument from the image. Decoding information may then be obtained 706 from an account verification database. In some instances, the decoding information may be associated with one or more of a financial institution or account number and the authentication system may use data value(s) corresponding to the financial institution/account number to retrieve the associated information. The decoding information obtained 706 may include an identifier of a decoding algorithm to use to decode the image security feature, a decoding algorithm, one or more keys used by a decoding algorithm, one or more decoding templates used by a decoding algorithm, or other types of information used to decode the image security feature.

The authentication system may then decode 708 the image security feature using the account decoding information. In some aspects, the decoding 708 may comprise determining a decoding algorithm to apply to the image security feature. The decoding algorithm to apply may be determined by obtaining an identifier of the decoding algorithm or the decoding algorithm itself from the account decoding information. The decoding algorithm to apply may also or alternatively at least be partially determined by determining a type associated with the image security feature, either by analyzing the image security feature or obtaining the type of image security feature used by a particular financial institution/account from the decoding information. By way of example, a financial institution or account holder may use Secure Seal™, two-dimensional bar codes, or other types of image security feature types on negotiable instruments associated with the financial institution or account. Once the decoding algorithm has been determined, the authentication system may execute the determined algorithm. In some cases, some of the decoding information, such as keys or decoding templates, may be used during the decoding 708 of the image security feature.

After the image security feature has been decoded, the decoding algorithm, or other component of the authentication system, may then extract 710 one or more verification values from the decoded image security feature and compare the verification values to corresponding data values included in the request. For instances, data value(s) corresponding to the payee name and/or payee amount printed on the negotiable instrument may be compared to values encoded in the image security feature.

If the verification values match 712, a result communication may be transmitted 714 indicating the image security feature has been verified as matching the data value(s). If the verification value(s) do not match 712, an error result communication may be transmitted 716 indicating the image security feature does not match one or more data values printed on the negotiable instrument. Additional information may optionally be provided indicating which data values(s) do not match.

As previously described with reference to FIG. 1, in some embodiments authentication system may also authenticate account ownership information. For example, data elements associated with the negotiable instrument account may be obtained from an account verification system (e.g., name and account number). The authentication system may then verify if the data element matches the corresponding data value (e.g., whether the retrieved name matches the name value printed on the check). If the data element matches the corresponding result, a positive response may be transmitted. Otherwise, a negative response may be transmitted. The positive/negative response may be transmitted in conjunction with the response communication transmitted indicating whether the image security feature matches data values obtained from the negotiable instrument.

In an alternative embodiment, a method of authenticating a negotiable instrument may not include blocks 706, 708, 710. Instead, a decoding entity may be determined. By way of example, the decoding entity may be the paying financial institution, an image security feature provider, or other entity capable of decoding the image security feature associated with the negotiable instrument. The decoding entity may be determined based at least in part on the received 704 data values. In some instances, a data store may be consulted to determine the decoding entity.

The alternative method may further include transmitting the image security feature to the decoding entity. Authentication information may then be received from the decoding entity. In some aspects, the authentication information may include verification values extracted from the image security feature and the method may continue at block 712. In other aspects, the comparison 712 of verification values to the received 704 data values may be performed by the decoding entity and authentication information may indicate a result of the comparison. A verification result or error result may then be transmitted 714 to the authentication requester.

In the foregoing description, for the purposes of illustration, methods were described in a particular order. It should be appreciated that in alternate embodiments, the methods may be performed in a different order than that described. Additionally, variations may be made to the methods described above. It should also be appreciated that the methods may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for authenticating a negotiable instrument, the method comprising:
   at an authentication system, receiving a plurality of data values associated with the negotiable instrument, the plurality of data values including an image security feature and at least one of a payee name, a payee amount and an account, where in the image security feature includes at least one encoded verification value which corresponds to at least one of the payee name, the payee amount and the account;
   obtaining account decoding information from an account verification database, the account verification database including decoding information for each of a plurality of financial institutions;
   decoding, at the authentication system, the image security feature using the account decoding information;
   extracting, at the authentication system, at least one of the verification values from the decoded image security feature;
   comparing, at the authentication system, each of the extracted verification values to at least one of the payee name, the payee amount and the account; and
   transmitting, from the authentication system, a result communication indicating a result of the comparison.

2. The method of claim 1, wherein decoding the image security feature comprises determining a decoding algorithm to apply to the image security feature.

3. The method of claim 2, wherein determining the decoding algorithm comprises obtaining an identifier of the decoding algorithm from the account decoding information.

4. The method of claim 2, wherein determining the decoding algorithm comprises obtaining the decoding algorithm from the account decoding information.

5. The method of claim 2, wherein determining the decoding algorithm comprises determining a type associated with the image security feature.

6. The method of claim 5, wherein determining the type comprises determining the image security feature is one of a Secure Seal and a two-dimensional bar code.

7. The method of claim 1, wherein obtaining the account decoding information comprises obtaining one or more keys to use to decode the image security feature.

8. The method of claim 1, wherein obtaining the account decoding information comprises obtaining one or more decoding templates to use to decode the image security feature.

9. The method of claim 1, wherein obtaining the account decoding information comprises obtaining a decoding algorithm.

10. The method of claim 1, wherein obtaining the account decoding information comprises obtaining financial institution decoding information for a financial institution associated with the account.

11. The method of claim 1, wherein receiving the plurality of data elements comprises receiving an image of the negotiable instrument.

12. The method of claim 11, further comprising extracting the data values from the image.

13. The method of claim 1, further comprising:
    obtaining a data element from an account verification database, the data element associated with the account and corresponding to one of the data values;
    verifying if the data element matches the corresponding data value;
    transmitting a positive response if the data element matches the corresponding data value; and
    transmitting a negative response if the data element does not match the corresponding data value.

14. A method comprising:
    obtaining, at an authentication system, first decoding information from a first financial institution, the first decoding information including information to decode a first type of negotiable instrument image security feature, wherein the negotiable instrument includes the image security feature and a payee name, a payee amount and an account, and wherein at least one of the payee name, the payee amount and the account is also encoded within the image security feature; and
    obtaining, at the authentication system, second decoding information from a second financial institution, the second decoding information including information to decode a second type of negotiable instrument image security feature.

15. The method of claim 14, further comprising:
    populating an account verification database with at least a portion of the first decoding information; and
    populating the account verification database with at least a portion of the second decoding information.

16. The method of claim 14, wherein obtaining first decoding information comprises obtaining a first decoding algorithm used to decode the first type of image security feature.

17. The method of claim 14, wherein obtaining first decoding information comprises obtaining keys used to decode the first type of image security feature.

18. The method of claim 14, further comprising:
    at the authentication system, collecting participant data elements from one or more participant institutions, the participant data elements associated with one or more participant accounts in the participant institution;
    at the authentication system, collecting non-participant data elements from one or more non-participant institutions, the non-participant data elements associated with one or more non-participant accounts in the non-participant institutions; and populating data element fields of an account verification database with the collected participant and non-participant data elements.

19. An account verification database comprising:

first decoding information for a first financial institution, the first decoding information used to decode a first type of negotiable instrument image security feature obtained from a negotiable instrument, wherein the negotiable instrument includes the image security feature and a payee name, a payee amount and an account, and wherein at least one of the payee name, the payee amount and the account is also encoded within the image security feature; and second decoding information for a second financial institution, the second decoding information used to decode a second type of negotiable instrument image security feature.

20. The database of claim 19, wherein the first decoding information includes at least one of a decoding algorithm, a key, and a decoding template.

21. The database of claim 19, wherein the database further comprises:

a first plurality of data element fields populated with participant data elements collected from one or more participant institutions, the participant data elements associated with one or more participant accounts in the participant institutions;

a second plurality of data element fields populated with non-participant data elements collected from one or more non-participant institutions.

22. A system comprising:

a communications interface to receive a plurality of data values associated with a negotiable instrument, the plurality of data values including an image security feature and at least one of a payee name, a payee amount and an account, the communications interface further to transmit a result communication indicating an authentication result, wherein the image security feature includes at least one encoded verification value which corresponds to at least one of the payee name, the payee amount and the account;

an account verification database storing decoding information for each of a plurality of financial institutions; and logic, communicatively coupled with the communications interface and the account verification database, to obtain account decoding information corresponding to the account from the account verification database, to decode the image security feature using the account decoding information, to extract at least one of the verification values from the decoded image security feature, and to determine the authentication result based at least in part on a comparison of each of the extracted verification values to at least one of the payee name, the payee amount and the amount.

23. The system of claim 22, further comprising:

a first decoding algorithm to decode a first type of image security feature;

a second decoding algorithm to decode a second type of image security feature; and wherein the logic is configured to decode the image security feature at least in part by executing one of the first decoding algorithm or the second decoding algorithm.

24. A method for authenticating a negotiable instrument, the method comprising:

receiving a request to authenticate a negotiable instrument, the request including an image security feature and at least one of a payee name, a payee amount and an account associated with the negotiable instrument, wherein the image security feature includes at least one encoded verification value which corresponds to at least one of the payee name, the payee amount and the account;

determining a decoding entity associated with the negotiable instrument;

transmitting the image security feature to the decoding entity;

receiving, from the decoding entity, authentication information associated with the image security feature based on a comparison of at least one of the verification values and at least one of the payee name, the payee amount and the account; and transmitting a result communication indicating an authentication result, the authentication result based at least in part on the authentication information.

25. The method of claim 24, further comprising:

transmitting the data values to the decoding entity; and wherein receiving the authentication information comprises receiving the authentication result.

* * * * *